United States Patent [19]
Ohmori et al.

[11] Patent Number: 5,448,602
[45] Date of Patent: Sep. 5, 1995

[54] DIVERSITY RADIO RECEIVER

[75] Inventors: Hideaki Ohmori; Zenichirou Nagasawa, both of Sendai, Japan

[73] Assignee: Small Power Communication Systems Research Laboratories Co., Ltd., Sendai, Japan

[21] Appl. No.: 10,886

[22] Filed: Jan. 29, 1993

[30] Foreign Application Priority Data

Sep. 9, 1992 [JP] Japan .................... 4-240856

[51] Int. Cl.6 ............ H04B 7/10; H04L 1/02
[52] U.S. Cl. .................. 375/347; 455/273; 375/330
[58] Field of Search ............ 375/347, 267, 330, 324, 375/260, 283, 346, 349; 455/137, 138, 139, 273, 132, 296, 303

[56] References Cited

U.S. PATENT DOCUMENTS 4,715,048 12/1987 Masamura .............. 375/100

OTHER PUBLICATIONS

Ogose, et al., IEEE Transactions on Vehicular Technology, vol. VT-33, No. 1, Feb. 1984, pp. 37–43. "A Transmitter Diversity for MSK with Two–Bit Differential Detection".

*Primary Examiner*—Stephen Chin
*Assistant Examiner*—Hai H. Phan
*Attorney, Agent, or Firm*—Oblon, Spivak, McClelland, Maier & Neustadt

[57] ABSTRACT

A plurality of reception branches receive digital modulated signals and convert received digital modulated signals into intermediate frequency signals having frequency differences having a predetermined relationship with a modulation baseband signal. An adder adds the intermediate frequency signals converted by the plurality of reception branches. A delayed and differential detection section delays and differentially detects a sum signal from the adder. A post detection filter filters a delayed and differentially detected signal from the delayed and differential detection section at a bandwidth higher than a Nyquist frequency of the received digital modulated signals, thereby outputting demodulated signals of the received digital modulated signals.

13 Claims, 5 Drawing Sheets

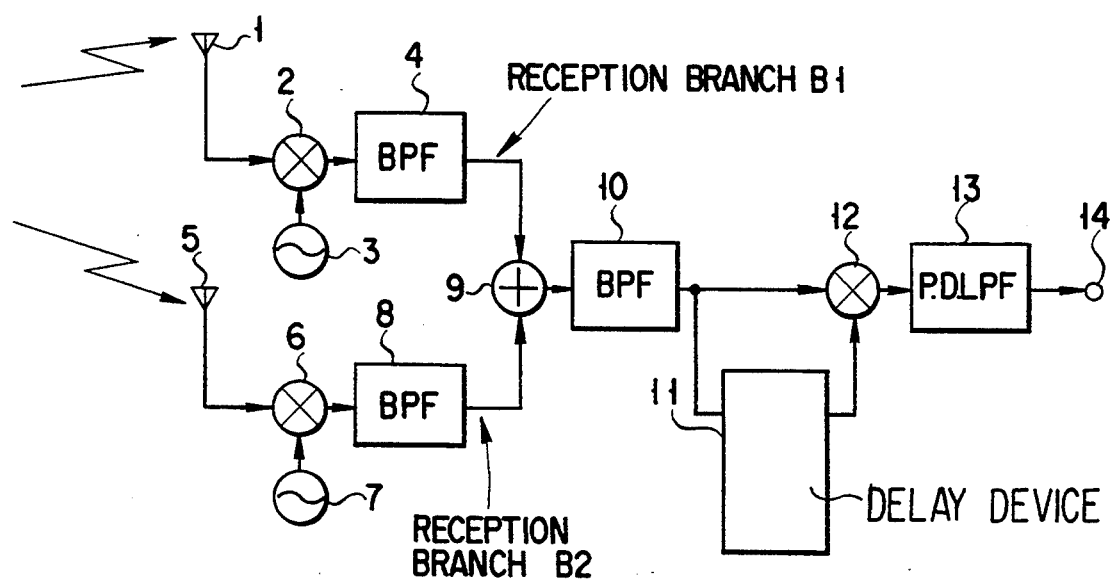
F I G. 1
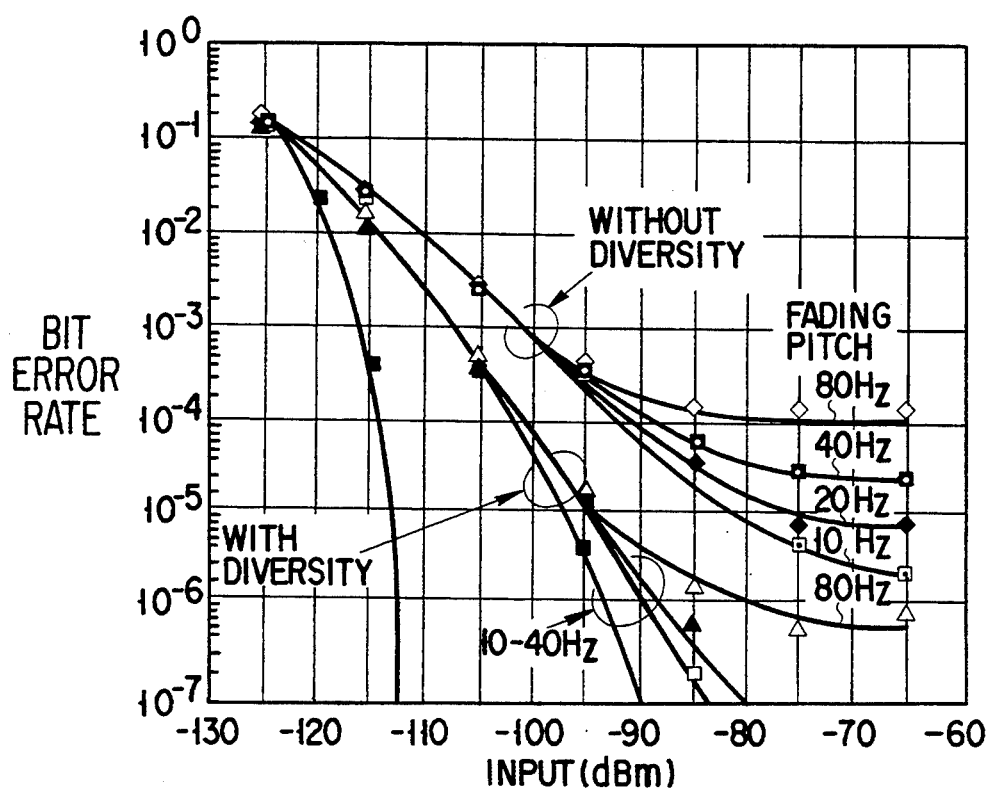
F I G. 2

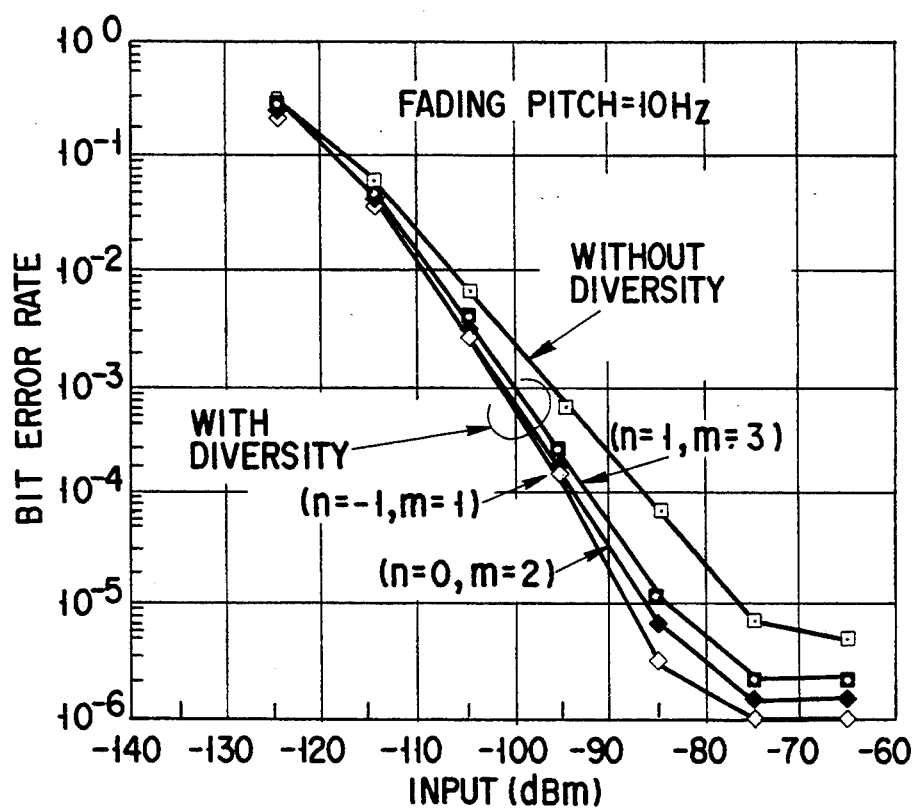
F I G. 3

DIVERSITY RADIO RECEIVER

BACKGROUND OF THE INVENTION

1. Field of the Invention

The present invention relates to a diversity radio receiver and, more particularly, to a reception local oscillator offset diversity radio receiver in a digital radio communication system.

2. Description of the Related Art

In digital radio communication and particularly mobile communication, it is not easy to always assure communication quality due to the presence of fading. For this reason, diversity techniques have been frequently used.

For example, a plurality of antennas spaced apart from each other so as to decrease the spatial correlation of the reception levels are used to perform reception by switching the reception antenna to an antenna having a higher level, or space diversity for synchronizing the frequencies and phases of input RF signals, or IF frequencies. Alternatively, offset transmission diversity for modulating carrier frequencies having a predetermined difference from two or more transmission base stations with the same baseband signal, simultaneously transmitting the modulated signals, and causing one antenna at the reception unit to receive the modulated signals.

In the former diversity scheme, since a circuit for comparing the two reception levels and a circuit for selecting a signal on the basis of the comparison result are required, or a circuit for detecting the difference of frequencies and phases between input signals and a circuit for adjusting them to be null, the circuit arrangement is undesirably complicated.

On the other hand, in the latter diversity scheme, the predetermined frequency difference between the plurality of base stations spaced apart from each other must be assured, and a circuit for minimizing a time lag between the modulation baseband signals of the respective stations is required. In addition, this scheme requires an implementation of circuit arrangements in both the transmission and reception units. Two or more electric waves are required in principle, thereby wasting the electric waves.

SUMMARY OF THE INVENTION

It is, therefore, an object of the present invention to provide a new and improved diversity radio receiver in which the plurality of electric waves which have been conventionally used need not be used, and a portable radio reception system capable of obtaining a diversity effect without requiring complicated phase control between a plurality of antennas can be realized.

It is another object of the present invention to provide a radio reception system wherein a plurality of electric waves need not be used, a diversity effect can be obtained without modifying a transmission unit and without any complexity in phase control between a plurality of antennas, and a diversity system can be easily formed into an IC or LSI.

According to a first aspect of the present invention, there is provided a diversity radio receiver for receiving and demodulating digital modulated signals with delayed and differential detection, the receiver comprising:

a plurality of reception branch means for respectively receiving the digital modulated signals and converting received digital modulated signals into intermediate frequency signals having frequency differences having a predetermined relationship with modulation baseband signal;

adding means for adding the intermediate frequency signals converted by the plurality of reception branch means;

delayed and differential detection means for delaying and differentially detecting a sum signal from the adding means; and post detection filter means for filtering a signal delayed and differentially detected by the delayed and differential detection means, using a bandwidth of not less than a Nyquist frequency of the received digital modulated signals, thereby outputting demodulated signals of the received digital modulated signals.

According to a second aspect of the present invention, there is provided a diversity radio receiver for receiving and demodulating digital modulated signals with delayed and differential detection, the receiver comprising:

a plurality of reception branch means for respectively receiving the digital modulated signals and converting received digital modulated signals into intermediate frequency signals having frequency differences having a predetermined relationship with a modulation baseband signal;

adding means for adding the intermediate frequency signals converted by the plurality of reception branch means;

delayed and differential detection means comprising
a delay device for delaying a sum signal from the adding means by a predetermined time,
a first mixer for mixing the sum signal from the adding means with a signal delayed by the delay device;
a phase shifter for phase-shifting the sum signal from the adding means or a delayed signal from the delay device by a predetermined phase-shifting amount; and
a second mixer for mixing the sum signal from the adding means with a signal phase-shifted by the phase shifter;

first and second post detection filter means for filtering signals from the first and second mixers in the delayed and differential detection means at predetermined bandwidths, respectively; and parallel/serial converting means for converting parallel signals respectively filtered by the first and second post detection filter means into a serial signal, thereby outputting a reproduced signal of the received digital modulated signal.

According to a third aspect of the present invention, there is provided a diversity radio receiver for receiving and demodulating digital modulated signals with delayed and differential detection, the receiver comprising:

a plurality of reception branch means for respectively receiving the digital modulated signals and converting received digital modulated signals into intermediate frequency signals having frequency differences having a predetermined relationship with a modulation baseband signal;

adding means for adding the intermediate frequency signals converted by the plurality of reception branch means;

frequency converting means for mixing a sum signal from the adding means with a signal having a frequency equal to a nominal center frequency of the intermediate frequency signal, thereby converting the sum signal into a low-frequency band signal;

baseband delayed and differential detection means for performing differential logic processing of the low-frequency band signal converted by the frequency converting means to perform baseband delayed and differential detection; and post detection filter means for filtering a signal parasychronously detected by the baseband delayed and differential detection means, at a predetermined bandwidth, thereby outputting a demodulated signal of the received digital modulated signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a basic circuit arrangement according to an embodiment of the present invention;

FIG. 2 is a graph showing characteristics obtained when the present invention is applied to two-baud (two-bit) delayed cosine detection of a GMSK signal for $m=1$ and $n=-1$;

FIG. 3 is a graph showing characteristics obtained when the present invention is applied to two-bit delayed cosine detection of the GMSK signal for $n=-1$ and $m=1$, $n=0$ and $m=2$, and $n=1$ and $m=3$;

DETAILED DESCRIPTION OF THE PREFERRED EMBODIMENT

Figure 4:
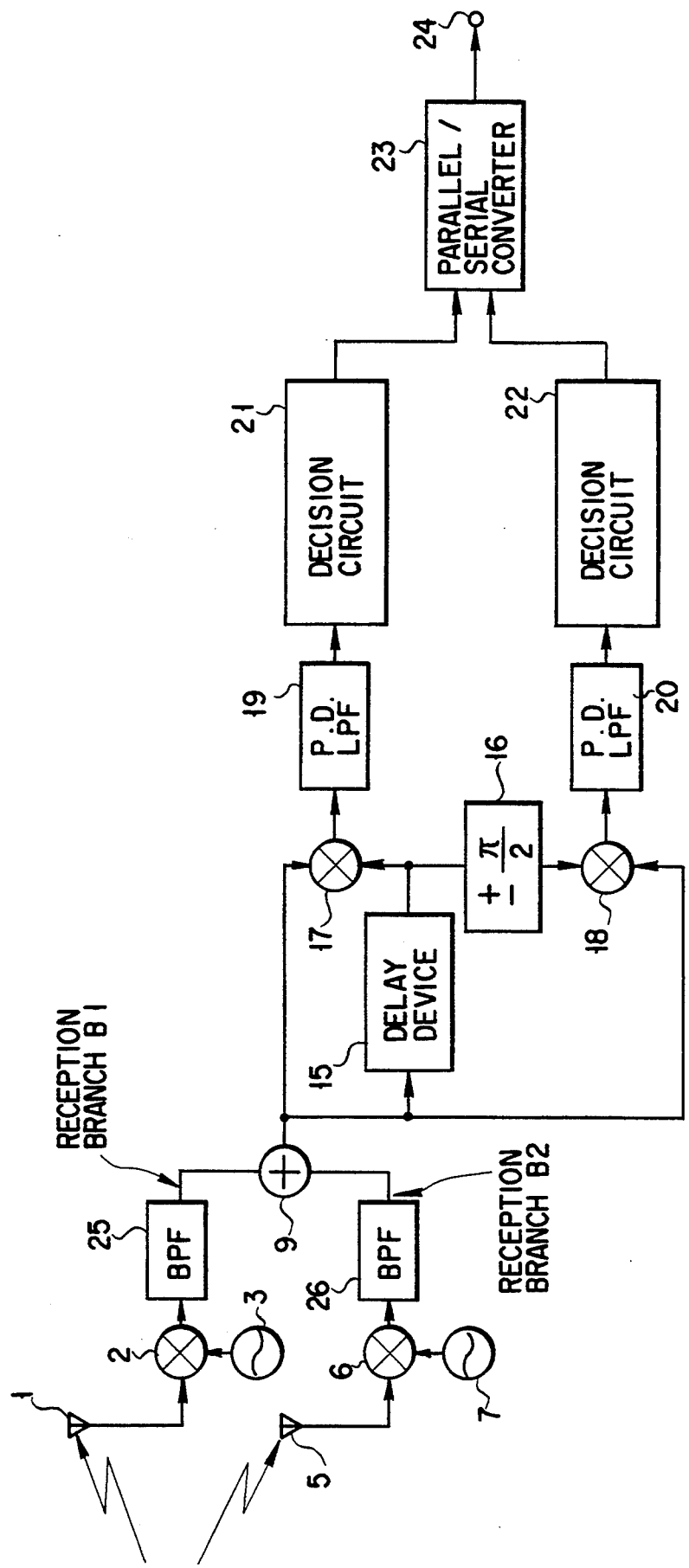
FIG. 4 is a block diagram showing a basic arrangement obtained when the present invention is applied to delayed detection of a $\pi/4$-shifted QPSK signal.

Reference will now be made in detail to the presently preferred embodiments of the invention as illustrated in the accompanying drawings, in which like reference characters designate like or corresponding parts throughout the several drawings.

In order to achieve the above objects of the present invention, the diversity scheme is based on the following first principle. Input signals from a plurality of reception branches are converted into IF signals including frequency differences having a predetermined relationship with a modulation baseband signal, and these signals are simply added to each other. The resultant sum signal is delayed and differentially detected through an IF filter. The filtered signal passes through an appropriate bandpass filter to obtain demodulated signals.

(First Embodiment)

The first embodiment of the present invention will be described in detail with reference to the accompanying drawings.

FIG. 1 is a block diagram of an arrangement obtained when two-branch space diversity is employed as diversity based on the first principle of the present invention.

Referring to FIG. 1, reference numeral 1 denotes a reception antenna in a reception branch B1; 2, a mixer for frequency conversion; 3, a reception local oscillator; 4, a bandpass filter for extracting a desired IF (intermediate frequency) signal 5, a reception antenna in a reception branch B2; 6, a mixer for frequency conversion; 7, a reception local oscillator; 8, a bandpass filter for extracting a desired IF signal; 9, an adder for synthesizing signals from the reception branches B1 and B2; 10, an IF filter for limiting the main band; and 11, a delay device; 12, a multiplier; 13, a post detection filter; 14, a detected/reproduced signal output terminal.

Assume that a carrier frequency of a received signal is given as fc and that an angle-modulated signal representing information is given as $\phi(t)$. In this case, an input signal r1(t) from the reception antenna 1 from the reception branch B1 is represented as follows:

$$r1(t) = R_1(t) \cos\{2\pi f_c t + \phi(t) + \theta_1(t)\} \quad (1)$$

where $R_1(t)$ and $\theta_1(t)$ are parameters representing the fading characteristics of a radio transmission path on the reception antenna 1 side. The parameters $R_1(t)$ and $\theta_1(t)$ are generally random variables representing a Rayleigh distribution and a uniform distribution of 0 to $2\pi$, respectively. These random variations cause degradation of the quality of the digital modulated signal received by the reception antenna 1. The above parameters are given under the assumption that no variations occur at about a modulation baud rate, i.e., the input waves are metastationary waves.

Input signals from the reception antenna 5 in the reception branch B2 are also represented as follows:

$$r2(t) = R_2(t) \cos\{2\pi f_c t + \phi(t) + \theta_2(t)\} \quad (2)$$

Parameters $R_2(t)$ and $\theta_2(t)$ in equation (2) have characteristics similar to those of the parameters $R_1(t)$ and $\theta_1(t)$, as a matter of course.

A signal received by the reception branch B1 is converted into an IF band signal by the local oscillator 3, the mixer 2, and the bandpass filter 4. Assume that the nominal IF frequency of the received digital modulated signal is defined as fi, that the baud rate of the modulation baseband signal is defined as fB, and a delayed baud rate in delayed detection (to be described later) is defined as d, the frequency of the signal converted to an IF band in the reception branch B1 is represented as follows:

$$fi1 = fi + m \cdot fB/d \quad (3)$$

The frequency of the signal converted to the IF band in the reception branch B2 is represented as follows:

$$fi2 = fi + n \cdot fB/d \quad (4)$$

where m and n are integers which satisfy the following condition:

$$m \sim n \geq d/2 \quad (\sim \text{represents a subtraction}) \quad (5)$$

The signals converted to the IF band signals of equations (1) and (2) by equations (3) to (5) are represented as follows:

$$ri1(t) = R_1(t)/2 \cdot \cos\{2\pi(fi + m \cdot fB/d)t + \phi(t) + \theta_1(t)\} \quad (6)$$

$$ri2(t) = R_2(t)/2 \cdot \cos\{2\pi(fi + n \cdot fB/d)t + \phi(t) + \theta_2(t)\} \quad (7)$$

Since a signal ri(t) synthesized by the adder 9 is the sum of the values of equations (6) and (7), the following equation is derived:

$$ri(t) = R_1(t)/2 \cdot \cos \\
\{2\pi(fi + m \cdot fB/d)t + \phi(t) + \theta_1\} + R_2(t)/2 \cdot \cos \\
\{2\pi(fi + n \cdot fB/d)t + \phi(t) + \theta_2\} \quad (8)$$

This signal is delayed and differentially detected by the delay device 11 and the mixer 12 through the main band limit IF filter 10. Since the fading parameters remain relatively constant with about a delay time $\tau$ on the order of the baud rate of the modulated signal, the following equations are obtained:

$$\left. \begin{array}{l} R_1(t) = R_1(t - \tau) = R_1, \; R_2(t) = R_2(t - \tau) = R_2 \\ \theta_1(t) = \theta_1(t - \tau) = \theta_1, \; \theta_2(t) = \theta_2(t - \tau) = \theta_2 \end{array} \right\} \quad (9)$$

A signal delayed by a delay time $\tau$ by the delay device 11 is given as follows:

$$ri(t - \tau) = R1/2 \cdot \cos\{2\pi(fi + m \cdot fB/d)(t - \tau) + \quad (10) \\
\phi(t - \tau) + \theta_1\} + R2/2 \cdot \cos \{2\pi(fi + n \cdot fB/d)(t - \tau) + \\
\phi(t - \tau) + \theta_2\}$$

Since the baud period is 1/fB, if a delay baud count is $\underline{d}$, $\tau = d/fB$ is established. The two signals represented by equations (8) and (10) are multiplied by each other in the mixer 12, and only a low-frequency component is extracted by the post detection filter 13. The extracted component v(t) is given as follows:

$$v(t) = R1^2/8 \cdot \cos\{\phi(t) - \phi(t - \tau) + 2\pi d \cdot \quad (11) \\
fi/fB + 2m\pi\} + R2^2/8 \cdot \cos\{\phi(t) - \phi(t - \tau) + \\
2\pi d \cdot fi/fB + 2n\pi\} + R1R2/8 \cdot \cos\{2\pi(m - n)/d \cdot fBt + \\
2\pi d \cdot fi/fB + 2n\pi + \phi(t) - \phi(t - \tau) + \theta_1 - \theta_2\} + \\
R1R2/8 \cdot \cos\{2\pi(n - m)/d \cdot fBt + 2\pi d \cdot \\
fi/fB + 2m\pi - \phi(t) + \phi(t - \tau) - \theta_1 + \theta_2\}$$

The third and fourth terms of equation (11) represent AC signals of (m-n)/d·fB. Although the third and fourth terms in equation (11) have opposite signs, the negative frequency term is folded by the zero frequency to finally become the same frequency as the positive frequency. For this reason, if condition m>n is established, equation (11) can be generally established. That is, in this case, since m-n≥d/2 is established, each of the frequencies of the third and fourth terms in equation (11) is given as (m-n)/d·fb≥fB/2 where fB/2 is the Nyquist frequency of the received digital modulated signal. If the band of the post detection filter 13 has a frequency higher than the Nyquist frequency, the third and fourth terms can be eliminated, so that only the first and second terms are left. The resultant equation is given as vd(t) as follows:

$$vd(t) = R1^2/8 \cdot \cos \\
\{\phi(t) - \phi(t - \tau) + 2\pi d \cdot fi/fB + 2m\pi\} + R2^2/8 \cdot \cos \\
\{\phi(t) - \phi(t - \tau) + 2\pi d \cdot fi/fB + 2n\pi\} \quad (12)$$

since $\underline{m}$ and $\underline{n}$ are integers, the following equation is defined:

$$vd(t) = R1^2/8 \cdot \cos\{\phi(t) - \phi(t - \tau) + \quad (13) \\
2\pi d \cdot fi/fB\} + R2^2/8 \cdot \cos\{\phi(t) - \phi(t - \tau) + 2\pi d \cdot \\
fi/fB\} = (R1^2 + R2^2)/8 \cdot \cos\{\phi(t) - \phi(t - \tau) + 2\pi d \cdot fi/fB\}$$

Equation (13) represents an equi-gain diversity output upon delayed and differential detection.

Delayed and differential detection can be achieved with delay of a plurality of bauds and sine detection and cosine detection as detection directions. When delayed and differential detection for the plurality of bauds is to be performed, a corresponding number is set in $\underline{d}$ in $\tau = d/fB$. Detection operations in the two different directions are performed as follows:

Sine Detection: $2\pi d \cdot fi/fB = \pm \pi/2 \; (\text{mod} 2\pi)$ $$v(t) = \pm(R1^2 + R2^2)/8 \cdot \sin\{\phi(t) - \phi(t - \tau)\} \quad (14)$$

Cosine Detection: $2\pi d \cdot fi/fB = 0, \pi \; (\text{mod} \; 2\pi)$ $$v(t) = \pm(R1^2 + R2^2)/8 \cdot \cos \{\phi(t) - \phi(t - \tau)\} \quad (15)$$

If sine and cosine detection values are negative, they can be processed through a polarity inverter. Both equations (14) and (15) are used for a signal requiring detection in orthogonal directions.

FIG. 2 shows the experimental result obtained in two-baud (two-bit) delayed cosine detection (m=1 and n=-1) of a GMSK (Gaussian Filtered Minimum Shift Keying) signal having a transmission band limit BbT=0.25 at various fading pitches.

FIG. 3 shows the experimental result for n=-1 and m=1, n=0 and m=2, and n=1 and m=3 at a fading pitch of 10 Hz.

As shown in FIGS. 2 and 3, as compared with the absence of diversity, a receiver (first embodiment) arranged based on the principle of the present invention apparently obtains a diversity effect (i.e., a bit error rate can be reduced to about 1/10 to 1/100).

In this experiment, a bandpass filter which covers the band of a composite signal obtained by adding the two reception branch signals is used as the main band limit of IF filter 10. However, it is possible to optimally set the bands of the filters 4 and 8 for cutting off image signals of the reception branches to constitute a main band limit filter, thereby omitting the IF filter 10.

(Second Embodiment)

FIG. 4 shows a circuit arrangement of a route roll-off filter type bandpass filter arranged in each of reception branches B1 and B2 which receive a $\pi/4$-shifted QPSK (Quadrature Phase Shift Keying) signal according to the second embodiment.

Referring to FIG. 4, reference numerals 25 and 26 denote route roll-off type bandpass filters each having an offset IF frequency as its center frequency; 15, a 1-baud delay device; 16, a $\pi/2$ phase shifter; 17, a cosine detection mixer; 18, a sine detection mixer; 19 and 20, post detection filters; 21 and 22, detected signal identification determination circuits; 23, a detection signal parallel/serial converter; and 24, a reproduced signal output terminal.

1-baud delayed detection is generally employed for the $\pi/4$-shifted QPSK signal. Both sine detection and cosine detection are required.

The same reference numerals as in FIG. 1 denote the same parts in FIG. 4, and a detailed description thereof will be omitted.

An operation of the arrangement in FIG. 4 will be described below.

In this case, a received signal is given by equation (15):

$$r(t) = R \cos(2\pi f c t + \phi_k) \tag{16}$$

Since delayed and differential detection may be performed for a $[r(t) \times r(t-\tau)]$ low-frequency component, the following relation is obtained:

$$R \cos(2\pi fct + \phi_k) \times R \cos\{2\pi(fc(t-\tau) + \phi_{kt}\} \to \tfrac{1}{2}R^2 \cos\{2\pi fct + \phi_k - \phi_{k-1}\} \tag{17}$$

If the circuit is adjusted so as to establish $\phi_k - \phi_{k-1} = \Delta\phi_k$ and $2\pi fct = 0 \pmod{2\pi}$, (the following relation is obtained:

$$\tfrac{1}{2}R^2 \cos(\Delta\phi_k) \tag{18}$$

If the circuit is adjusted so as to establish $\phi_k - \phi_{k-1} = \Delta\phi_k$ and $2\pi fc\tau = \pi/2 \pmod{2\pi}$, the following relation is obtained:

$$\tfrac{1}{2}R^2 \sin(\Delta\phi_k) \tag{19}$$

Substitutions of modulation phase amounts $\pi/4$, $3\pi/4$, $-3\pi/4$, $-\pi/4$ on the transmission side into $\Delta\phi_k$ yield values (only signs are taken into consideration) in the following table.

| $\Delta\phi_k$ | $\tfrac{1}{2}R^2 \sin\Delta\phi_k$ | $\tfrac{1}{2}R^2 \cos\Delta\phi_k$ |
| --- | --- | --- |
| $\tfrac{\pi}{4}$ | + | + |
| $\tfrac{3}{4}\pi$ | + | − |
| $-\tfrac{3}{4}\pi$ | − | − |
| $-\tfrac{\pi}{4}$ | − | + |

In the above table, if "+" is caused to correspond to 0, and "−" is caused to correspond to 1, symbolic series $X_k$ and $Y_k$ contained in the received signal are reproduced. If these series are processed through the parallel/serial converter 23, the original serial signal series can be restored.

Referring to FIG. 4, an output from the delay device 15 is equal to the value obtained from equation (10), and an output from the adder 9 is equal to the value obtained from equation (8). The low-frequency component of an output from the mixer 17 is equal to the value obtained from equation (11). The third and fourth terms of equation (11) are AC signals of $(m-n)/d \cdot fB$, and the first and second terms are baseband signals. The frequency of the post detection filter 19 is set at the Nyquist frequency $fB/2$ or more, and the AC signal frequency satisfies the following condition:

$$\frac{m-n}{d} f_B > \frac{f_B}{2} \tag{20}$$

so that the post detection filter 19 cuts off the AC components of the third and fourth terms of equation (11), but allows the baseband signals of the first and second to pass therethrough.

An output from the post detection filter 19 is the value from equation (13). Cosine detection as the detecting operation of the mixer 17 indicates that $(2\pi d \cdot f_i)/fB = 0 \pmod{\pi}$ in equation (13), so that an output of equation (15) is obtained.

An output from the other mixer 18 performs sine detection of a signal obtained by phase-shifting the delayed signal by $\pm\pi/2$ by the phase shifter. This operation is equivalent to an operation of $(2\pi d \cdot f_i)/fB = \pm\pi/2 \pmod{2\pi}$. Therefore, an output from the post detection filter 20 is represented by equation (15). If the sampling time is given as $t = kT$, i.e., $\phi_k \Delta\phi(kt)$, equation (14) is rewritten as follows:

$$V(t) = \pm \frac{(R_1^2 + R_2^2)}{8} \sin\Delta\phi_k \tag{21}$$

and equation (15) is also rewritten as follows:

$$V(t) = \pm \frac{(R_1^2 + R_2^2)}{8} \cos\Delta\phi_k \tag{22}$$

The correspondence in the above table can be established, thereby reproducing the original signal series. This is performed in the detected signal decision circuits 21 and 22. As previously described, since the outputs of equations (14) and (15) represent equigain diversity outputs upon delayed and differential detection, the circuit arrangement shown in FIG. 4 can achieve a diversity receiver of the $\pi/4$-shifted QPSK signal.

In order to solve the conventional problems, the present invention has the second principle that input signals from a plurality of reception branches are converted into IF signals having frequency differences having a predetermined correspondence to with a modulation baseband signal, these signals are simply added to each other, the resultant sum signal is delayed and differentially detected through an IF filter, and the filtered signal passes through an appropriate bandpass filter to obtain demodulated signals.

(Third Embodiment)

The third embodiment based on the second principle of the present invention will be described with reference to the accompanying drawings.

Figure 5:
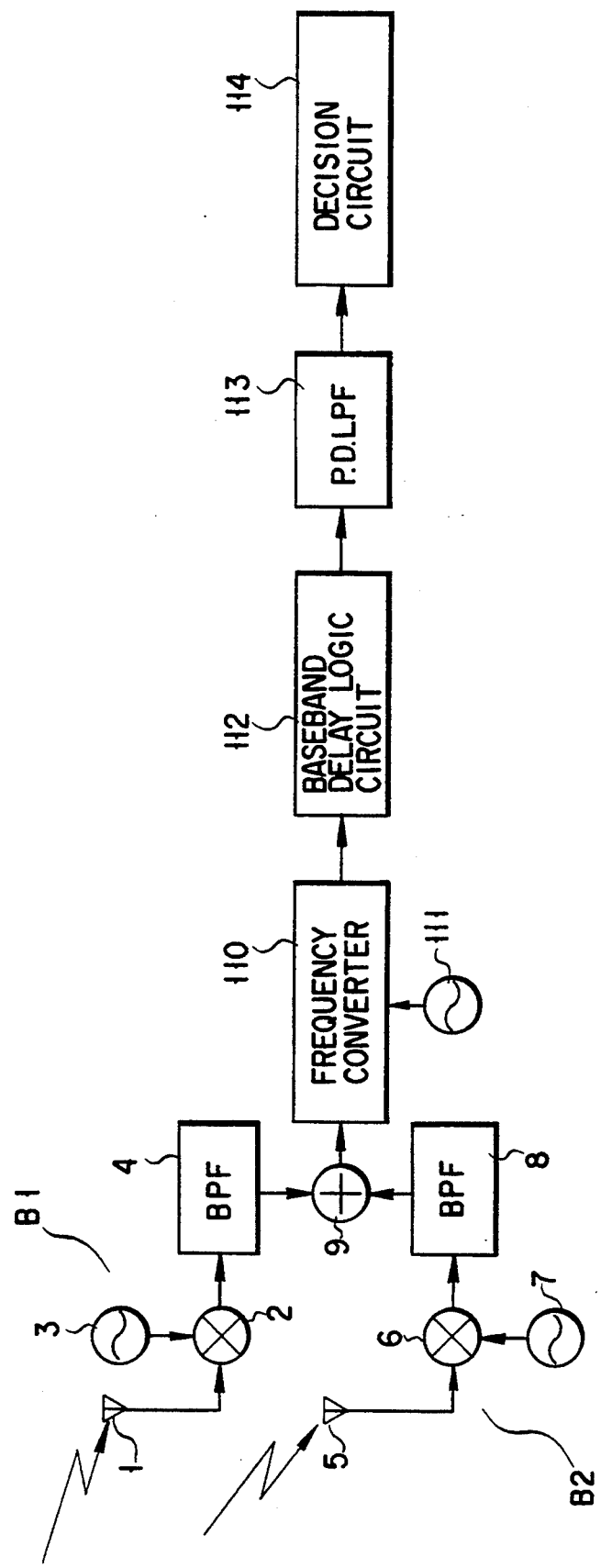
FIG. 5 is a block diagram showing a basic circuit arrangement according to another embodiment of the present invention.

FIG. 5 is a block diagram showing an arrangement when 2-branch space diversity is employed as diversity on the basis of the second principle of the present invention. Reference numeral 1 denotes an antenna of a branch B1; 2, a frequency conversion mixer; 3, a reception local oscillator; 4, a bandpass filter for extracting a desired IF frequency; 5, an antenna of a branch B2; 6, a frequency conversion mixer; 7, a reception local oscillator; 8, a bandpass filter for extracting a desired IF frequency; 9, an adder for synthesizing signals from the branches B1 and B2; 110, a frequency converter for baseband differential detection; 111, a local oscillator for baseband differential detection; 112, a baseband delay logic circuit (see FIG. 6 of the fourth embodiment for further details); 113, a post detection filter; 114, a decision circuit.

If a carrier frequency is defined as fc and an angle-modulated signal is defined as $\phi(t)$, an angle-modulated transmission signal s(t) is expressed as follows:

$$s(t)=\cos\{2\pi f_c t+\phi(t)\} \quad (23)$$

The signal s(t) is transmitted, and a signal r1(t) received at the reception antenna 1 of the reception branch B1 is given as follows:

$$r_1(t)=R_1(t)\cos\{2\pi f_c t+\phi(t)+\theta_1(t)\} \quad (24)$$

where $R_1(t)$ and $\theta_1(t)$ are parameters representing the fading characteristics of a radio transmission path on the reception antenna 1 side. The parameters $R_1(t)$ and $\theta_1(t)$ are generally random variables representing a Rayleigh distribution and a uniform distribution of 0 to $2\pi$, respectively. As described above these parameters represent change in rate which remains relatively constant at about a modulation baud rate of the transmission signal.

An input signal at the reception antenna 5 of the reception branch B2 can be similarly represented as follows:

$$r_2(t)=R_2(t)\cos\{2\pi f_c t+\phi(t)+\theta_2(t)\} \quad (25)$$

Parameters $R_2(t)$ and $\theta_2(t)$ in equation (24) have characteristics similar to those of the parameters $R_1(t)$ and $\theta_1(t)$, as a matter of course. A signal received by the reception branch B1 is converted into an IF band signal by the local oscillator 3, the mixer 2, and the bandpass filter 4. Assume that the nominal IF frequency is defined as fi, and that an offset amount of the local oscillation frequency from the nominal frequency is defined as $\delta f1$. In this case, a frequency fi1 converted to the IF band in the reception branch B1 is expressed as follows:

$$f_{i1}=f_i+\delta f_1 \quad (26)$$

A frequency fi2 converted into the IF band in the reception branch B2 is similarly defined as follows:

$$f_{i2}=f_i+\delta f_2 \quad (27)$$

The signals converted to the IF bands are represented as follows:

In Reception Branch B1:

$$r_{i1}(t)=R_1(t)/2\cdot\cos\{2\pi(f_i+\delta f_1)t+\phi(t)+\theta_1(t)\} \quad (28)$$

In Reception Branch B2:

$$r_{i2}(t)=R_2(t)/2\cdot\cos\{2\pi(f_i+\delta f_2)+\phi(t)+\theta_2(t)\} \quad (29)$$

The adder 9 simply adds the values obtained from equations (28) and (29) to produce a composite signal ri(t) as follows:

$$r_i(t) = r_{i1}(t) + r_{i2}(t) = \quad (30)$$

$$R_1(t)/2\cdot\cos\{2\pi(f_i + \delta f_1)t + \phi(t) + \theta_1(t)\} +$$

-continued
$$R_2(t)/2\cdot\cos\{2\pi(f_i + \delta f_2)t + \phi(t) + \theta_2(t)\}$$

The nominal center frequency of the IF band is fi. Therefore, a signal from the local oscillator 111 for converting the composite signal to a low-frequency band can be expressed as follows:

$$C(t)=\cos\{2\pi f_i t+\Theta\} \quad (31)$$

$\Theta$ is the phase term of the local oscillation signal. An output low-frequency component D(t) from the frequency converter 110 is obtained from equations (30) and (31) as follows:

$$D(t)=R_1(t)/4\cdot\cos\{2\pi\delta f_1 t+\phi(t)+\theta_1(t)-\Theta\}+R_2(t)/4\cdot\cos\{2\pi\delta f_2 t+\phi(t)+\theta_2(t)-\Theta\} \quad (32)$$

If $\Theta=0 \pmod{2\pi}$, then an in-phase component I(t) of the cosine output can be obtained as follows:

$$I(t)=\tfrac{1}{4}\cdot R_1(t)\cos\{2\pi\delta f_1 t+\phi(t)+\theta_1(t)\}+\tfrac{1}{4}\cdot R_2(t)\cos\{2\pi\delta f_2 t+\phi(t)+\theta_2(t)\} \quad (33)$$

Similarly, if $\Theta=\pi/2 \pmod{2\pi}$, an orthogonal component Q(t) of the sine output is obtained as follows:

$$Q(t)=\tfrac{1}{4}\cdot R_1(t)\sin\{2\pi\delta f_1 t+\phi(t)+\theta_1(t)\}+\tfrac{1}{4}\cdot R_2(t)\sin\{2\pi\delta f_2 t+\phi(t)+\theta_2(t)\} \quad (34)$$

Equations (33) and (34) are calculated by the baseband delay logic circuit 112. As described above, equations (33) and (34) can be rewritten using equations (19) as follows:

$$I(t)=R_1/4\cdot\cos\{2\pi\delta f_1 t+\phi(t)+\theta_1\}+R_2/4\cdot\cos\{2\pi\delta f_2 t+\phi(t)+\theta_2\} \quad (35)$$

$$Q(t)=R_1/4\cdot\sin\{2\pi\delta f_1 t+\phi(t)+\theta_1\}+R_2/4\cdot\sin\{2\pi\delta f_2 t+\phi(t)+\theta_2\} \quad (36)$$

A signal obtained by delaying the time $\tau$ is given from equations (35) and (36) as follows:

$$I(t-\tau)=R_1/4\cdot\cos\{2\pi\delta f_1(t-\tau)+\phi(t-\tau)+\theta_1 56 +R_2/4\cdot\cos\{2\pi\delta f_2(t-\tau)+\phi(t-\tau)+\theta_2\} \quad (35)$$

Similarly, an orthogonal component $Q(t-\tau)$ is given as follows:

$$Q(t-\tau)=R_1/4\cdot\sin\{2\pi\delta f_1(t-\tau)+\phi(t-\tau)+\theta_1\}+R_2/4\cdot\sin\{2\pi\delta f_2(t-\tau)+\phi(t-\tau)+\theta_2\} \quad (38)$$

The following logic processing using equations (35), (36), (37), and (38) is performed:

$$I(t)I(t-\tau) + Q(t)Q(t-\tau) = 1/16\cdot \quad (39)$$

$$[R_1^2\cos\{\Delta\phi(t) + 2\pi\delta f_1\tau\} + R_2^2\cos\{\Delta\phi(t) + 2\pi\delta f_2\tau\} + R_1R_2\cos\{2\pi(\delta f_1 - \delta f_2)t + \Delta\phi(t) + \Delta\theta + 2\pi\delta f_2\tau\} +$$

$$R_1R_2\cos\{2\pi(\delta f_1 - \delta f_2)t - \Delta\phi(t) + \Delta\theta - 2\pi\delta f_1\tau\}]$$

$$Q(t)I(t-\tau) + I(t)Q(t-\tau) = 1/16\cdot \quad (40)$$

$$[R_1^2\sin\{\Delta\phi(t) + 2\pi\delta f_1\tau\} + R_2^2\sin\{\Delta\phi(t) + 2\pi\delta f_2\tau\} + R_1R_2\sin\{2\pi(\delta f_1 - \delta f_2)t + \Delta\phi(t) + \Delta\theta + 2\pi\delta f_2\tau\} -$$

$$R_1R_2\sin\{2\pi(\delta f_1 - \delta f_2)t - \Delta\phi(t) + \Delta\theta - 2\pi\delta f_1\tau\}]$$

$\Delta\phi(t)=\phi(t)-\phi(t-\tau)$ and $\Delta\theta=\theta 1-\theta 2$. In equations (39) and (40), the third and fourth terms represent AC signals of $\delta f_1 - \delta f_2$. Since this difference frequency should be taken as the Nyquist frequency or more, if this component is cut off by the post detection filter 113, only the first and second terms are left in equations (39) and (40), thereby assuring the necessary spectral components:

$$I(t)I(t-\tau)+Q(t)Q(t-\tau)=1/16\cdot[R_1^2 \cos\{\Delta\phi(t)+2\pi\delta f_1\tau\}+R_2^2 \cos\{\Delta\phi(t)+2\pi\delta f_2\tau\}] \quad (41)$$

$$Q(t)I(t-\tau)-I(t)Q(t-\tau)=1/16\cdot[R_1^2 \sin\{\Delta\phi(t)+2\pi\delta f_1\tau\}+R_2^2 \sin\{\Delta\phi(t)+2\pi\delta f_2\tau\}] \quad (42)$$

If the delay baud count is defined as $d$, the delay time $\tau$ of the delay logic circuit 112 is given as $\tau = d/f_B$. The IF band signal having as a difference an integer multiple of a value obtained by dividing the modulation baud rate of the transmission digital signal by the delay baud count is given as $\delta f_1 \sim \delta f_2 = f_B/d \times k$ (where k is an integer; $\sim$ represents a difference). This equation is modified as follows:

$$2\pi\delta f_1\tau \sim 2\pi f_2\tau = 2\pi\tau \times (f_B/d \times k) \quad (43)$$

in this case, since $\tau = d/f_B$, then $$2\pi\delta f_1\tau \sim 2\pi\delta f_2\tau = 2\pi k \quad (44)$$

that is, since $2\pi\delta f_1\tau = 2\pi\delta f_2\tau = 0$ (mod $2\pi$), equations (41) and (42) are rewritten as follows:

$$I(t)(t-\tau)+Q(t)Q(t-\tau)=1/16\cdot(R_1^2+R_2^2)\cos\{\Delta\phi(t)\} \quad (45)$$

$$Q(t)I(t-\tau)-I(t)Q(t-\tau)=1/16\cdot(R_1^2+R_2^2)\sin\{\Delta\phi(t)\} \quad (46)$$

Equation (45) represents an equi-gain diversity output upon delayed cosine detection, and equation (46) represents an equi-gain diversity output upon delayed sine detection. when a signal of a modulated signal of binary differential coding is to be delayed and detected, the output from equation (45) or (46) is used in accordance with the necessary detection direction, thereby obtaining diversity-processed demodulated output of the received signal. When a modulated signal of multivalue differential coding is to be delayed and differentially detected, both outputs from equations (45) and (46) are used to obtain a diversity output.

(Fourth Embodiment)

Figure 6:
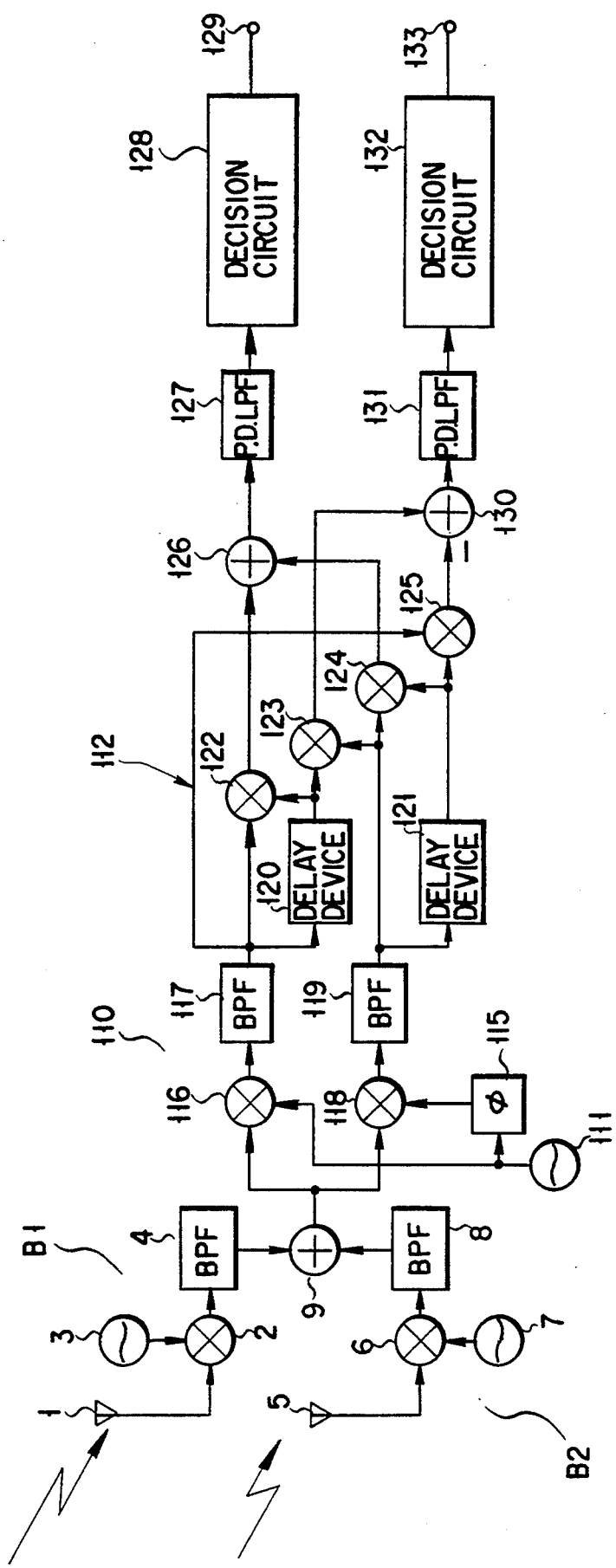
FIG. 6 is a block diagram showing a basic circuit arrangement when the present invention is applied to delayed detection of a QPSK or $\pi/4$-shifted QPSK signal.

FIG. 6 shows a circuit arrangement when the present invention is applied to a multivalue modulated signal such as a QPSK signal or a $\pi/4$-shifted QPSK signal. Reference numeral 115 denotes a $\pi/2$ phase shifter; 116, a mixer for performing frequency conversion along the cosine axis as one of the two orthogonal directions; 117, an image cutoff filter; 118, a mixer for performing frequency conversion along the sine axis as the other one of the two orthogonal directions; 119, an image cut-off filter; 120 and 121, delay devices for a delay logic circuit 112; 122, 123, 124, and 125, multipliers for performing multiplications; 126, an adder; 127, a post detection filter; 128, a decision circuit 129, a cosine detection output terminal; 130, an adder for adding inputs after the polarity of one of the inputs is inverted; 131, a post detection filter; 132, a decision circuit; and 133, a sine detection output terminal. In the QPSK or $\pi/4$-shifted QPSK signal scheme, when parallel signals from the output terminal 129 and the other output terminal 133 are converted into a serial signal to obtain a desired demodulated signal.

When the present invention is applied to a signal for performing binary modulation upon differential coding, such as a BPSK or GMSK (including MSK) signal, the delay times of the delay devices 120 and 121 are set at predetermined values, and an output signal from the output terminal 129 or 133 is used as a modulated signal in correspondence with the detection axis.

When offset values $\delta f_1$ and $\delta f_2$ from the nominal IF frequencies of the reception local oscillators 13 and 14 satisfy the following the relation:

$$\delta f_1 = -\delta f_2 \quad (47)$$

the converted frequencies of the first and second terms of equations (31) and (32) become equal to each other. If frequencies are different from each other, a roll-off transmission system is arranged in units of branches, or an inexpensive filter for only cutting off the image is used as each of filters 4 and 8 used in main band limitations. Only one filter having predetermined characteristics is inserted between the frequency converter 110 and the delay logic circuit 112. In FIG. 6, each of the filters 117 and 119 has predetermined characteristics. In this case, filters having identical characteristics can be used, thereby facilitating their manufacture.

As has been described with reference to the experimental results, when a receiver arrangement according to the first principle of the present invention is used, reception quality can be improved by a diversity effect without modifying the transmission unit, without using a plurality of electric waves, and without using a complicated phase control synchronization technique.

According to the first principle of the present invention, there is provided a diversity radio receiver for receiving a digital modulated signal and demodulating the modulated signal in accordance with delayed and differential detection, wherein input signals from a plurality of reception branches are converted into IF signals having frequency differences having a predetermined relationship with a modulation baseband signal, the IF signals are added to each other, a sum signal is delayed and differentially detected through an IF filter, and a demodulated signal is obtained through a filter having a predetermined bandwidth.

According to the first principle of the present invention, there is also provided a diversity radio receiver for receiving a digital modulated signal and demodulating the modulated signal in accordance with delayed and differential detection, wherein integers are assigned to a plurality of reception branches so that differences between the integers are equal to or larger than a value obtained by dividing a delay baud count in delayed detection by 2, the baud rates of the modulation baseband signals are multiplied with amounts divided by the delay baud count in the delayed and differential detection, frequencies obtained by adding these products to the nominal IF frequencies are defined as IF frequency bands of the plurality of branches, signals converted to these IF frequency bands are added, delay operations are performed at predetermined times and phase amounts so as to perform the delayed and differential detection, and a demodulated signal is obtained through a post detection filter having a bandwidth of at greater than or equal to the Nyquist frequency.

As has been described, according to the second principle of the present invention, when a receiver arrangement according to the present invention is used, reception quality can be improved by a diversity effect without modifying the transmission unit, without using a plurality of electric waves, and without using a complicated phase control synchronizing technique. In addition, since processing is performed with the baseband, the diversity circuit can be easily formed into an IC or LSI.

According to the second principle of the present invention, there is also provided a diversity radio receiver for transmitting or receiving a digital signal to perform delayed and differential detection, wherein when signals from a plurality of reception branches are to be converted into IF band signals, the input signals are converted into the IF band signals such that differences as amounts of an integer multiple of a value obtained by dividing the modulation baud rate of the transmission digital signal by the delay baud count are obtained, and the differences are the Nyquist frequency or more, the converted IF band signals are filtered through a proper bandpass filter, the filtered signals are added to each other to obtain a sum, the sum is frequency-converted into a low-frequency signal by using a local oscillation signal having a nominal center frequency of the IF band as the signal frequency, thereby performing so-called baseband delayed and differential detection for performing differential logic processing in this band, and then the detected signal is filtered through a proper baseband filter having at least the Nyquist bandwidth, thereby reproducing the transmitted signal.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A diversity radio receiver for receiving and demodulating digital modulated signals with delayed and differential detection, said receiver comprising:

a plurality of reception branch means for respectively receiving the digital modulated signals and converting received digital modulated signals into intermediate frequency signals having frequency differences having a predetermined correspondence to a modulation baseband signal;

adding means for adding the intermediate frequency signals converted by said plurality of reception branch means;

delayed and differential detection means for delaying and differentially detecting a sum signal from said adding means; and post detection filter means for filtering a signal delayed and detected by said delayed and differential detection means, using a bandwidth of not less than a Nyquist frequency of the received digital modulated signals, thereby outputting demodulated signals of the received digital modulated signals, wherein said plurality of reception branch means set the frequency differences having the predetermined relationship so as to satisfy the following equations if the frequencies of the intermediate frequency signals are given as fi1 and fi2:

$$fi1 = fi + m \cdot fB/d, \text{ and } fi2 = fi + n \cdot fB/d$$

where fi: a nominal intermediate frequency of the received digital modulated signals, fB: a baud rate of the modulation baseband signal, d: a delay baud count of said delayed and differential detection means, and m, n: integers satisfying $m \sim n \geq d/2$ (wherein $\sim$ represents a subtraction).

2. A receiver according to claim 1, wherein said plurality of reception branch means include filters for cutting off image signals in corresponding branches.

3. A receiver according to claim 1, further comprising main band limit intermediate frequency filter means, arranged between said adding means and said delayed and differential detection means, for filtering a composite signal from said adding means at a bandwidth which covers a band of the composite signal and supplying a filtered composite signal to said delayed and differential detection means.

4. A receiver according to claim 1, wherein each of said plurality of reception branch means comprises:

a reception antenna for receiving the digital modulated signals transmitted as modulation signals of a predetermined carrier wave;

a local oscillator for outputting a local oscillation signal for converting the digital modulated signals received by said reception antenna into an intermediate frequency signal having a frequency difference having a predetermined relationship with a modulation baseband signal thereof;

a mixer for mixing the digital modulated signals received by said reception antenna with the local oscillation signal output from said local oscillator; and a bandpass filter for filtering a signal from said mixer at a predetermined bandwidth, thereby outputting the intermediate frequency signal.

5. A receiver according to claim 1, wherein said delayed and differential detection means comprises a delay device for delaying the sum signal from said adding means for a predetermined time period, and a mixer for mixing the sum signal from said adding means with a signal delayed by said delay device.

6. A receiver according to claim 1, wherein the digital modulation signal includes a GMSK signal.

7. A diversity radio receiver for receiving and demodulating digital modulated signals with delayed and differential detection, said receiver comprising:

a plurality of reception branch means for respectively receiving the digital modulated signals and converting received digital modulated signals into intermediate frequency signals having frequency differences having a predetermined correspondence to a modulation baseband signal;

adding means for adding the intermediate frequency signals converted by said plurality of reception branch means;

frequency converting means for mixing a sum signal from said adding means with a signal having a frequency equal to a nominal center frequency of the intermediate frequency signal, thereby converting the sum signal into a low-frequency band signal;

baseband delayed and differential detection means for performing differential logic processing of the low-frequency band signal converted by said frequency converting means to perform baseband delayed and differential detection; and post detection filter means for filtering a signal detected by said baseband delayed and differential detection means, at a predetermined bandwidth, thereby outputting a demodulated signal of the received digital modulated signals, wherein said plurality of reception branch means set the frequency differences having the predetermined relationship so as to satisfy the following equations if the frequencies of the intermediate frequency signals are given as fi1 and fi2:

$$fi1 = fi + m \cdot fB/d, \text{ and } fi2 = fi + n \cdot fB/d$$

where fi: a nominal intermediate frequency of the received digital modulated signals, fB: a baud rate of the modulation baseband signal, d: a delay baud count of said delayed and differential detection means, and m, n: integers satisfying $m \sim n \geq d/2$ (wherein $\sim$ represents a subtraction), so that the frequency difference is set to be no less than a Nyquist frequency of the received digital modulated signal.

8. A receiver according to claim 7, wherein each of said plurality of reception branch means comprises:

a reception antenna for receiving the digital modulated signals transmitted as modulation signals of a predetermined carrier wave;

a local oscillator for outputting a local oscillation signal for converting the digital modulated signals received by said reception antenna into an intermediate frequency signal having a frequency difference having a predetermined relationship with a modulation baseband signal thereof;

a mixer for mixing the digital modulated signals received by said reception antenna with the local oscillation signal output from said local oscillator; and a bandpass filter for filtering a signal from said mixer at a predetermined bandwidth, thereby outputting the intermediate frequency signal.

9. A receiver according to claim 7, wherein the predetermined bandwidth in said post detection filter means includes at least a Nyquist bandwidth of the received digital modulated signal.

10. A receiver according to claim 7, wherein said frequency converting means comprises:

a local oscillator for outputting a local oscillation signal having a frequency equal to a nominal center frequency of the intermediate frequency signal;

phase-shifting means for phase-shifting the local oscillation signal from said local oscillator by $\pi/2$;

a first mixer for mixing the sum signal from said adding means with the local oscillation signal from said local oscillator; and a second mixer for mixing the sum signal from said adding means with a $\pi/2$-phase-shifted signal from said phase-shifting means.

11. A receiver according to claim 10, wherein said baseband delayed and differential detection means comprises:

first and second delay devices for delaying output signals from said first and second mixers by predetermined times, respectively;

first to fourth multipliers for mutually multiplying the output signals from said first and second mixers and output signals from said first and second delay devices;

a first adder for adding outputs from said first and third multipliers; and a second adder for adding an output from said second multiplier and polarity inverted output from said fourth multiplier, respectively.

12. A receiver according to claim 11, wherein said post detection filter means comprises first and second post detection filters for filtering outputs from said first and second adders, respectively.

13. A receiver according to claim 12, further comprising first and second filters arranged to cut off images included in the output signals from said first and second mixers, respectively.

* * * * *